(12) United States Patent
Boldt et al.

(10) Patent No.: US 11,891,531 B2
(45) Date of Patent: Feb. 6, 2024

(54) FORMULATION FOR APPLICATION ONTO GLASS, PORCELAIN, TILES, METALS AND PLASTIC FOIL

(71) Applicant: Heraeus Deutschland Gmbh & Co. KG, Hanau (DE)

(72) Inventors: Kai-Ulrich Boldt, Hanau (DE); Peter Kraemer, Hanau (DE); Susanne Behl, Hanau (DE)

(73) Assignee: HERAEUS DEUTSCHLAND GMBH & CO. KG, Hanau (DE)

(*) Notice: Subject to any disclaimer, the term of this patent is extended or adjusted under 35 U.S.C. 154(b) by 81 days.

(21) Appl. No.: 16/748,314

(22) Filed: Jan. 21, 2020

(65) Prior Publication Data

US 2021/0222024 A1 Jul. 22, 2021

(51) Int. Cl.
| | |
|---|---|
| *C09D 11/52* | (2014.01) |
| *C09D 5/24* | (2006.01) |
| *B41M 5/00* | (2006.01) |
| *C09D 11/03* | (2014.01) |
| *C09D 11/38* | (2014.01) |

(52) U.S. Cl.
CPC ........... *C09D 11/52* (2013.01); *B41M 5/0023* (2013.01); *C09D 5/24* (2013.01); *C09D 11/03* (2013.01); *C09D 11/38* (2013.01)

(58) Field of Classification Search
CPC ......... C09D 11/52; C09D 11/03; C09D 11/33; C09D 11/36; C09D 11/37; C09D 11/38; C09D 5/24; B41M 5/023
USPC ................................. 106/1.18, 1.23; 252/514
See application file for complete search history.

(56) References Cited

U.S. PATENT DOCUMENTS

| | | | |
|---|---|---|---|
| 10,246,161 B2 | 4/2019 | Kinpara | |
| 2003/0124259 A1* | 7/2003 | Kodas | H05K 3/105 427/376.6 |
| 2003/0148024 A1* | 8/2003 | Kodas | C23C 18/08 106/1.23 |
| 2005/0173680 A1 | 8/2005 | Yang | |
| 2009/0226541 A1* | 9/2009 | Scholz | A61P 31/04 424/672 |
| 2013/0203642 A1* | 8/2013 | Huchel | C11D 3/3765 510/101 |
| 2016/0185990 A1* | 6/2016 | Cho | H01B 1/16 252/514 |
| 2017/0130084 A1 | 5/2017 | Kell et al. | |
| 2020/0032092 A1* | 1/2020 | Seyed Jamali | B22F 1/054 |

FOREIGN PATENT DOCUMENTS

| | | |
|---|---|---|
| CN | 1690136 A | 11/2005 |
| CN | 106574135 A | 4/2017 |
| KR | 20140098922 A | 8/2014 |
| KR | 20170023994 A | 3/2017 |
| TW | 201800301 A | 3/2018 |
| WO | 2015/192248 A1 | 12/2015 |
| WO | 2018/146617 A1 | 8/2018 |

OTHER PUBLICATIONS

English translation of Office Action and Search Report (completed Apr. 10, 2020) received for counterpart Taiwan application No. 108137517.
Office Action with Search Report dated Oct. 25, 2022 in TW Application No. 108137517 (English translation of Search Report only).

* cited by examiner

*Primary Examiner* — Tri V Nguyen
(74) *Attorney, Agent, or Firm* — Panitch Schwarze Belisario & Nadel LLP

(57) ABSTRACT

The invention relates to a composition containing at least the two following components: a) a silver carboxylate, and b) a terpene, an ink for ink jet printing and a paste for printing with a screen printing method, wherein the ink or the paste, respectively, each contains the composition according to the invention. The invention also relates to a method for producing a pattern on a substrate, at least comprising the following steps: A) providing a substrate and a composition containing at least one silver carboxylate and one terpene; B) applying the composition to the substrate while preserving a precursor with the pattern; C) treating the precursor with the pattern according to a treatment step that is selected from the group consisting of: a) at a temperature of more than 200° C. for at least 10 minutes, wherein the treatment is preferably carried out in an atmosphere of air; b) a photonic sintering process; c) a combination of a) and b), wherein the substrate to which the pattern is applied is preserved. The invention further relates to a printer, an item that is coated at least in part, and a use of the composition according to the invention for applying a pattern.

15 Claims, 1 Drawing Sheet

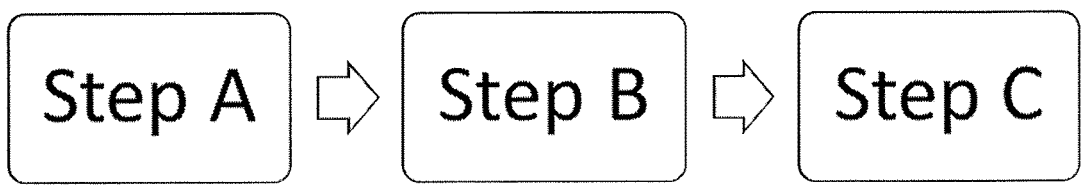

FORMULATION FOR APPLICATION ONTO GLASS, PORCELAIN, TILES, METALS AND PLASTIC FOIL

The invention relates to a composition containing at least the two following components: a) a silver carboxylate, and b) a terpene; an ink for ink jet printing, and a paste for printing with a screen printing method, wherein the ink or the paste, respectively, each contains the composition according to the invention. The invention also relates to a method for producing a pattern on a substrate, at least comprising the following steps: A) providing a substrate and a composition containing at least one silver carboxylate and one terpene; B) applying the composition onto the substrate while preserving a precursor with the pattern; C) treating the precursor with the pattern according to a treatment step that is selected from the group consisting of: a) at a temperature of more than 200° C. for at least 10 minutes, wherein the treatment is preferably carried out in an atmosphere of air; b) a photonic sintering process; c) a combination of a) and b), wherein the substrate to which the pattern is applied is preserved. The invention further relates to a printer, an item that is coated at least in part, and a use of the composition according to the invention for applying a pattern

BACKGROUND OF THE INVENTION

It is known to use metal-containing, liquid to pasty compositions for producing metallic colours or electrically conducting structures on surfaces. Their use is manifold, including the coating of tableware, float glass, plastic, items made of artificial resin, hollow glass, tiles, sanitary objects, furnishings, as well as the production of conductive tracks, electric circuits and the like. There have been a number of attempts to improve such compositions in terms of optimisation of manufacturing costs, colours, gloss, conductivity, storage stability, as well as applicability to various surfaces.

There have been several prior-art attempts to offer silver-coloured precious metal preparations. In addition to silver, these preparations usually contain further precious metal components or semiprecious metal components or both, such as at least one component based on copper, tungsten or vanadium, or a combination of two or more components thereof. Some of the silver-coloured precious metal preparations do not contain any silver at all, but are based on a mixture of gold and platinum compounds or gold and palladium compounds. The use of these comparatively expensive raw materials is reflected in the price of the silver-coloured precious metal preparations produced with them, and is associated with the disadvantage that the electrical conductivity always lags behind the maximum possible electrical conductivity of an exclusively silver-based composition.

In prior art, there is still a need for improved lacquers, especially for silver-containing, liquid to pasty compositions. There is also a need to conserve resources of the comparatively rare precious metals gold, palladium and platinum. In particular, there is a need for low-cost silver-containing, applicable compositions that can be used to produce glossy precious metal layers and conductive structures.

Objects

It is an object of the present invention to obviate, at least in part, one or more of the drawbacks resulting from prior art.

It is an object of the invention to provide a composition with as low a silver content as possible in combination with a comparatively high conductivity.

It is a further object of the invention to provide a silver-containing composition which contains as few metal components other than silver as possible, in particular as few other precious metal components as possible, and above all no gold.

It is an object of the invention to provide a silver-containing composition which has good storage stability and can be used flexibly.

It is a further object of the invention to present a method which can be used to apply a silver-containing composition to a substrate by means of an ink jet printing method.

It is a further object of the invention to present a method which can be used to apply a silver-containing composition to a substrate by means of a screen printing method.

It is a further object of the invention to present a method which can be used to apply an electrically conducting structure with a high electrical conductivity to a substrate.

It is a further object of the invention to present a method which can be used to apply a metallically glossy pattern having a high degree of gloss to a substrate.

It is a further object of the invention to present a low-cost method which can be used to apply a silver-containing coating to a substrate, said coating having a good electrical conductivity.

It is a further object of the invention to present a low-cost method which can be used to apply a silver-containing coating to a substrate, wherein the formulation to be applied has a good storage stability.

It is a further object of the invention to present a low-cost method which can be used to apply a silver-containing coating to a substrate, said coating having a high degree of metallic gloss.

It is a further object of the invention to provide an item which has an electrically conducting coating.

It is a further object of the invention to provide an item which has an electrically conducting coating with as low a silver content as possible.

It is a further object of the invention to provide an item which has a pattern with a high degree of metallic gloss.

It is a further object of the invention to provide an item which has a durable pattern with a high degree of metallic gloss.

Preferred Embodiments of the Invention

A contribution to the at least partial achievement of at least one of the aforementioned objects is made by the independent claims. The dependent claims provide preferred embodiments which contribute to the at least partial achievement of at least one of the objects.

|1| A composition containing at least the following components:
   (I) silver carboxylate; and
   (II) a terpene.

The sum of the percentages by weight of all components of the composition according to the invention always results in 100 wt. %. Preferably, the composition according to the invention has as further components, for example, one or more organic solvents, adhesion promoters, viscosity aids, and additives, or a combination of two or more thereof.

|2| The composition according to embodiment 1, wherein the terpene is selected from the group consisting of orange terpene, limonene, pinene, or a combination thereof.

|3| The composition according to any one of the preceding embodiments, wherein the total percentage by weight of the components containing one or more of the elements selected from the group consisting of gold, rhodium, vanadium, palladium, platinum, osmium and tungsten is less than 10 wt. %, based on the total weight of the composition.

|4| The composition according to any one of the preceding embodiments, wherein the composition contains at least one carboxylic acid as a further component. Preference is given to tertiary carboxylic acids with at least 5 carbon atoms. Particular preference is given to neo decanoic acid.

|5| The composition according to any one of the preceding embodiments, wherein the weight ratio of component a) to component b) is within a range from 4:1 to 1:4.

|6| The composition according to any one of the preceding embodiments, wherein the sum of the percentages by weight of a) and b) is within a range from 20 to 95 wt. %, based on the total weight of the composition.

|7| The composition according to any one of the preceding embodiments, wherein the percentage by weight of component a) is within a range from 10 to 80 wt. %, based on the total weight of the composition.

|8| The composition according to any one of the preceding embodiments, wherein the weight ratio of silver to the sum of the elements gold, rhodium, vanadium, palladium, platinum, osmium, copper and tungsten is more than 100:1, preferably more than 150:1, based on the percentages by weight in the composition.

|9| The composition according to any one of the preceding embodiments, wherein the weight ratio of silver to rhodium is more than 100:1, preferably more than 150:1, based on the percentages by weight in the composition.

|10| The composition according to any one of the preceding embodiments, wherein the silver carboxylate is silver neo decanoate.

|11| The composition according to any one of the preceding embodiments, wherein the content of metal particles is less than 1 wt. %, based on the total weight of the composition.

|12| The composition according to any one of the preceding embodiments, wherein the precious metal content is within a range from 1 to 30 percent, based on the total weight of the composition.

|13| The composition according to any one of the preceding embodiments, wherein a coat of this composition applied to a substrate in a volume of 5 μl/cm² has a gloss of more than 1300 GU, said coat subsequently being sintered at 230° C. for at least 1 min and cooled down to room temperature.

|14| The composition according to any one of the preceding embodiments, wherein a coat of this composition applied to a substrate in a volume of 5 μl/gm² has an electrical conductivity of at least 30%, based on the conductivity of silver, said coat subsequently being sintered at 230° C. for at least 1 min and cooled down to room temperature.

|15| The composition according to any one of the preceding embodiments, wherein the composition has at least one of the following further components:
  i) organic solvent;
  ii) adhesion promoter;
  iii) viscosity aid;
  iv) additive; or
  a combination of two or more thereof.

|16| The composition according to any one of the preceding embodiments, wherein the composition has a viscosity within a range from 5 to 5000 mPa·s.

|17| A method for producing a composition according to any one of embodiments |1| to |16|, comprising the following steps:
  (I) providing the terpene;
  (II) providing the silver carboxylate;
  (III) where appropriate, providing at least one further component;
  (IV) mixing the components provided in steps (I) to (III).

|18| An ink for ink jet printing, wherein the ink contains a composition according to any one of embodiments |1| to |17|.

|19| A paste for printing with a screen printing method, wherein the paste contains a composition according to any one of embodiments |1| to |17|.

|20| A method for producing a pattern on a substrate, at least comprising the following steps:
  A) providing a substrate and a composition containing silver carboxylate and terpene as well as, where appropriate, at least one further component;
  B) applying the composition to the substrate while preserving a precursor with the pattern;
  C) treating the precursor with the pattern according to a treatment step that is selected from the group consisting of:
    a) at a temperature of more than 200° C. for at least 10 minutes, wherein the treatment is preferably carried out in an atmosphere of air;
    b) a photonic sintering process;
    c) a combination of a) and b),
  wherein the substrate to which the pattern is applied is preserved.

An optional step D) may comprise cooling down to room temperature.

|21| The method according to embodiment |20|, wherein the terpene is selected from the group consisting of orange terpene, limonene and pinene, or a combination thereof.

|22| The method according to embodiment |20| or |21|, wherein the substrate is selected from the group consisting of glass, porcelain, earthenware, stoneware, fine stoneware, enamel, plastic, silicon, silicon dioxide, aluminium oxide, gallium arsenide, germanium, silicon germanium alloy, indium phosphide, a metal, or a combination of two or more thereof.

|23| The method according to any one of embodiments |20| to |22|, wherein the pattern is selected from an element of the group consisting of
  (A) a glossy decor;
  (B) an electrically conducting structure; or
  (C) a combination of (A) and (B).

|24| The method according to any one of embodiments |20| to |23|, wherein the applying is achieved by means of a printer.

|25| The method according to any one of embodiments |20| to |24|, wherein the applying is achieved by means of ink jet printing.

|26| The method according to any one of embodiments |20| to |24|, wherein the applying is achieved by means of screen printing.

|27| The method according to any one of embodiments |20| to |26|, wherein the pattern includes at least one of the following properties:

i) a gloss of at least 1300 GU, measured as per DIN ISO 2813:2015;
ii) an electrical conductivity of at least 30%, based on the conductivity of silver; or
a combination of the two properties.

|28| A printer, at least including a printer head and a reservoir, wherein the reservoir contains a composition according to any one of embodiments |1| to |16|, or with an ink according to embodiment |18|, or a paste according to embodiment |19|.

|29| The printer according to embodiment |28|, wherein the printer is suitable and provided for carrying out a method according to any one of embodiments |20| to |27|.

|30| An item, containing, at least in part, at least a silver-containing coating, wherein the coating contains a total percentage by weight of elements that are selected from the group consisting of gold, rhodium, vanadium, palladium, platinum, osmium and tungsten, of less than 5 wt. %, based on the total weight of the coating.

|31| The item according to embodiment |30|, wherein the coating is characterised by at least one of the following features:
(I) a gloss of more than 1300 GU;
(II) an electrical conductivity of more than at least 30%, based on the conductivity of silver; or
(III) a combination of the two features (I) and (II).

|32| A use of a composition containing silver carboxylate, more particularly silver neo decanoate, and at least one terpene for applying a pattern.

|33| The use according to embodiment |32|, wherein the pattern has a gloss of at least 1300 GU.

|34| The use according to embodiment |32| or |33|, wherein the pattern has an electrical conductivity of at least 30%, based on the conductivity of silver.

General Information

In the present description, range specifications also include the values specified as limits. Thus, a specification of the type "within the range from X to Y" in relation to a variable A means that A can take the values X, Y and values between X and Y. The values of one-sidedly limited ranges of the type "up to Y" for a variable A correspondingly are to be interpreted as Y and less than Y.

DETAILED DESCRIPTION OF THE INVENTION

The first aspect of the present invention relates to a composition containing at least the following components:
(I) silver carboxylate; and
(II) a terpene.

Where appropriate, the composition according to the invention may further contain one or more further components, each of which is particularly selected from the group consisting of adhesion promoters, viscosity aids, organic solvents, such as glycol ether, and additives. The sum of the percentages by weight of all components of the composition according to the invention always results in 100 wt. %.

As a matter of principle, the composition according to the invention may have any state that is known and seems suitable to the person skilled in the art. The state may depend on the ambient conditions of the composition according to the invention, one or more of the components of the composition according to the invention itself, or a combination thereof. Preferably, the composition according to the invention is liquid to pasty. A composition is liquid if its viscosity is within a range from 1 to 300 mPa·s. The viscosity of a composition is determined as per the DIN 53019 standard (Viscometry—Measurement of viscosities and flow curves by means of rotational viscometers). Among others, a Brookfield rheometer (Brookfield DV3) can be used for this purpose.

As a matter of principle, any composition that is known and seems suitable for the present invention to the person skilled in the art and that contains the components, i.e., at least one silver carboxylate and at least one terpene, required for the first subject matter of the invention, can be used as composition according to the invention.

In the present context, silver carboxylate is a salt with silver cations and carboxylic acid anions. The carboxylic acid portion of the carboxylic acid anion may be linear or branched, or it may have cyclic structural elements, and it can be saturated or unsaturated. In the first instance, the silver carboxylate usually is a solid. If the composition according to the invention is liquid or a mixture consisting of solid and liquid components, the silver carboxylate may have changed to the dissolved form at least in part or completely.

Preferably, linear saturated silver carboxylates are selected. Particular preference is given to an element that is selected from the group consisting of silver acetate, silver propionate, silver butanoate, silver pentanoate, silver hexanoate, silver heptanoate, silver octanoate, silver nonanoate, silver decanoate, silver undecanoate, silver dodecanoate, silver tetradecanoate, silver hexadecanoate, silver octadecanoate, as well as the silver iso carboxylates and the silver neo carboxylates of the aforementioned elements, or a combination of two or more thereof. Particular preference is given to silver neo carboxylates with 5 or more carbon atoms, such as silver neo pentanoate, silver neo hexanoate, silver neo heptanoate, silver neo octanoate, silver neo nonanoate, silver neo decanoate, and silver neo dodecanoate. The corresponding neocarboxylic acids are, for example, produced by Shell or Exxon. A particularly preferred silver carboxylate is silver neo decanoate.

In the present context, a terpene is a naturally occurring unsaturated hydrocarbon that can be isolated from natural products, the skeleton of which can be attributed to one or more isoprene units. Today, some of the terpenes can also be obtained industrially and artificially. Usually, the polymers of cis- and trans-polyisoprene are not considered to be terpenes. Preferably, the terpene is an acyclic terpene or a cyclic terpene. Preferred among the cyclic terpenes are monocyclic terpenes.

According to a preferred embodiment, the terpene is selected from the group consisting of orange terpene, limonene and pinene, or a combination thereof.

Orange terpenes are understood to mean a liquid mixture of terpenes having a boiling point within a range from 170 to 180° C. (p=1 bar), which is usually obtained by cold-pressing orange peels. Orange terpene contains more than 80 wt. %, preferably more than 85 wt. % and most preferably more than 90 wt. % (+)/(−) of limonene. Often, the other components of orange terpene are the aldehydes octanal, decanal, sinensal and octyl- and neryl-acetate. Orange terpene (CAS no. 68647-72-3) can, for example, be purchased from Carl Roth GmbH, 76231 Karlsruhe, Germany.

In the present context, a pinene is a monoterpene hydrocarbon with the empirical formula $C_{10}H_{16}$. A particularly preferred pinene is β-pinene (CAS no. 19902-08-0).

In the present context, limonene contains (r)-(+)-limonene, (s)-(−)-limonene, as well as a mixture of the two at any ratio desired, for example, as a racemic mixture.

According to a further preferred embodiment of the present invention, the weight ratio of component a), silver carboxylate, to component b), terpene, in the composition according to the invention is within a range from 4:1 to 1:4, preferably 1:2 to 2:1, or 1:1 to 1:2, most preferably from about 1:1.5 to about 1:2. The term "about" means that, within the scope of the accuracy specified, a person skilled in the art also reads all values that are commercially rounded to the number mentioned. In the case of 1:2, this means, for example, a range from inclusive 1:1.5 to 2:4.9, each based on the weight of silver carboxylate and terpene. Where a liquid composition is concerned, such values can, for example, be determined from an HPLC measurement, wherein a characteristic signal is selected for each component and put into relationship with each other.

According to a further preferred embodiment of the present invention, the sum of the percentages by weight of the components a), silver carboxylate, and b) terpene, is within a range from 20 to 95 wt. %, based on the total weight of the composition. Further preferably, the sum of the percentages by weight of the components a) and b) is within a range from 35 to 95 wt. % or from 35 to 80 wt. % or from 40 to 60 wt. %, most preferably from 45 to 55 wt. %, wherein each of the percentages by weight is based on the total weight of the composition.

According to a further preferred embodiment of the present invention, the percentage by weight of component a), silver carboxylate, is within a range from 10 to 80 wt. %, preferably from 10 to 60 wt. % or from 15 to 45 wt. %, wherein each of the percentages by weight is based on the total weight of the composition.

According to a further embodiment of the present invention, the composition may contain at least one, two, three or more carboxylic acids as a further component. As a matter of principle, any carboxylic acid that is known and seems suitable to the person skilled in the art can be used as carboxylic acids, more particularly one or more tertiary carboxylic acids with 5 and more carbon atoms. One or a combination of more of the following elements can be selected as tertiary carboxylic acid: neo pentane acid, neo hexanoic acid, neo heptanoic acid, neo octanoic acid, neo nonanoic acid, neo decanoic acid, and neo dodecanoic acid. Neo decanoic acid or a combination of neo decanoic acid with a further one of the neo carboxylic acids mentioned is particularly preferred. Neo carboxylic acids are, for example, produced by Shell or Exxon. The composition according to the invention can be stored for a prolonged period of time by adding a carboxylic acid or a combination of several carboxylic acids.

According to a further preferred embodiment of the present invention, the composition has a weight ratio of silver to the sum of the elements gold, rhodium, vanadium, palladium, platinum, osmium, copper and tungsten of more than 100:1, preferably of more than 150:1, based on the weight ratios in the composition.

According to a further preferred embodiment of the present invention, the composition has a weight ratio of silver to rhodium of more than 100:1, preferably of more than 150:1, based on the weight ratios in the composition.

According to a further preferred embodiment of the present invention, the total percentage by weight of the components, containing one or more of the elements selected from the group consisting of gold, rhodium, vanadium, palladium, platinum, osmium and tungsten in the composition according to the invention is less than 10 wt. %, preferably less than 8 wt. % or 6 wt. %, further preferably less than 5 wt. % and most preferably less than 2 wt. % or less than 1 wt. %, wherein each of the percentages by weight is based on the total weight of the composition.

According to a further preferred embodiment of the present invention, the total percentage by weight of the components, containing one or more of the elements selected from the group consisting of rhodium, vanadium and osmium in the composition according to the invention is less than 1 wt. %, preferably less than 0.5 wt. % or less than 0.2 wt. %, wherein each of the percentages by weight is based on the total weight of the composition.

According to a further preferred embodiment of the present invention, the content of metal particles of the composition according to the invention is less than 1 wt. % or less than 0.5 wt. % or less than 0.2 wt. %, wherein each of the percentages by weight is based on the total weight of the composition. As a result, the composition according to the invention virtually does not contain any metal particles. In the present context, metal particles always are solids.

According to a further preferred embodiment of the present invention, the precious metal content is within a range from 1 to 30%, each based on the total weight of the composition. In the context of this invention, the term precious metal is understood to mean the following substances: gold, silver, mercury, palladium, platinum, rhodium, iridium, ruthenium, and osmium.

According to a further preferred embodiment of the present invention, a coat of the composition according to the invention applied to a substrate in a volume of 5 µl/m$^2$ has a gloss of more than 1300 GU, said coat having been sintered at 230° C. for 1 min and subsequently cooled down to room temperature. Within the scope of the present invention, room temperature is understood to mean a temperature of +20° C. (293 K).

In the context of the present invention, any solid that is known and seems suitable to the person skilled in the art is suitable as substrate. Particularly preferred substrates at least partially contain an element selected from the group consisting of glass, porcelain, earthenware, stoneware, fine stoneware, metal, artificial resin, enamel, plastic film, plastic items, silicon, silicon dioxide, aluminium oxide, gallium arsenide, germanium, silicon germanium alloy, indium phosphide, or a combination of two or more thereof.

According to a further preferred embodiment of the present invention, a coat of the composition according to the invention applied to the substrate in a volume of 5 µl/m$^2$ has an electrical conductivity of at least 30%, based on the conductivity of silver, said coat having been sintered at 230° C. for at least 1 min and subsequently cooled down to room temperature. The conductivity of silver is 6.14'10$^7$ A*m/V, at 20° C.

According to a further preferred embodiment of the present invention, the composition comprises at least one of the following further components:
  i) organic solvent;
  ii) adhesion promoter;
  iii) viscosity aid;
  iv) additive; or
a combination of two or more thereof.

Preferably, the composition according to the invention has a percentage by weight within a range from 0.1 to 80 wt. %, preferably from 20 to 80 or from 20 to 50 wt. % of an organic solvent, wherein each of the percentages by weight is based on the total weight of the composition according to the invention.

Preferably, one or more solvents selected from the group of glycol ethers, one or more further terpenes, or a combination of two or more of the mentioned solvents can be used as an organic solvent. This includes a combination of several glycol ethers, several terpenes, and one or more glycol ethers with one or more terpenes.

Glycol ethers are understood to mean organic substances which have at least one ethylene glycol unit or one diethylene glycol unit. The glycol ether that is selected with particular preference is propylene glycol ether or dipropylene glycol ether. Commercially available examples are Dowanol PNP (propylene glycol n-propyl ether) and Dowanol PnB (propylene glycol n-butyl ether), Dowanol DPnB (dipropylene glycol n-butyl ether) as well as Dowanol DPnP (dipropylene glycol n-propyl ether).

As a matter of principle, one of the terpenes mentioned as component b) of the present invention, or even a terpene that is not mentioned there, can be selected as a further terpene.

Preferably, the composition according to the invention has adhesion promoters with a percentage by weight within a range from 0.1 to 5 wt. %, based on the total weight of the composition according to the invention.

Preferably, rhodium alkyl compounds are suitable as adhesion promoters. The rhodium alkyl compounds have at least one alkyl residue. If a rhodium alkyl compound has more alkyl residues than one, for example, 2 or 3 alkyl residues, these alkyl residues may be identical or different. Preferably, the at least one alkyl residue has a length of 2 to 20 carbon atoms, more preferably a length of 12, 14, 16 or 18 carbon atoms. A particularly preferred adhesion promoter is rhodium nonanoate.

Preferably, the composition according to the invention has viscosity aids with a percentage by weight within a range from 5 to 30 wt. %, further preferably within a range from 10 to 20 wt. %, wherein each of the percentages by weight is based on the total weight of the composition according to the invention.

Preferably, a colophony or derivatives thereof are selected as viscosity aids. A particularly preferred commercial product is gum rosin which can be purchased from H. Reynaud & Fils GmbH, Hamburg, Germany.

Preferably, the composition according to the invention has further additives with a percentage by weight within a range from 0.05 to 3 wt. %, further preferably within a range from 0.05 to 1 wt. %, wherein each of the percentages by weight is based on the total weight of the composition according to the invention. All chemical substances and mixtures that are known and seem suitable for the present intended use to the person skilled in the art can be used as further additives. Silicone-containing additives, for example, one or more additives containing polyether modified polydimethylsiloxane are particularly preferred as further additives. Such additives are, for example, available under their trade name BYK and can be purchased from BYK Additives & Instruments GmbH, 46483 Wesel, Germany.

According to a further preferred embodiment of the present invention, the composition has a viscosity within a range from 5 to 5000 mPa·s, for example, within a range from 2 to 100 mPa·s, or within a range from 500 to 3000 mPa·s. The viscosity is determined as per the DIN 53019 standard specified in the test methods, using the measuring instrument designated there.

A second aspect of the present invention is a method for producing a composition according to the first aspect of the present invention or to one of the embodiments of the first aspect of the invention, wherein the method comprises the following steps:

(I) providing the terpene;
(II) providing the silver carboxylate;
(III) where appropriate, providing the further components;
(IV) mixing the components provided in steps (I) to (III).

The components mentioned according to the first aspect of the present invention or to one of its embodiments are used as terpene, silver carboxylate and, where appropriate, further components, for example, one or more carboxylic acids. As a matter of principle, mixing can be carried out in any way that is familiar and seems suitable for the present case to the person skilled in the art. For example, components (I), (II) and, where appropriate, (III) can be put together and then mixed. As an alternative or in addition, a mixture thus formed can be further mixed by introducing air or other gas bubbles. In some cases, mixing can further be carried out at an increased temperature. In one embodiment, mixing is carried out at an increased temperature, but a temperature of the mixture of 40° C. is not exceeded. The composition produced according to the method is stored at room temperature or at a lower temperature, e.g., in a refrigerator (T=2-8° C.).

A third aspect of the present invention is an ink, particularly for ink jet printing, wherein the ink contains a composition according to the first aspect of the present invention or to one of its embodiments. An ink is a liquid composition that is suitable for an application by means of an ink jet printer.

Preferably, the ink has a viscosity within a range from 2 to 100 mPa·s or from 2 to 50 mPa·s. The viscosity is determined according to the information given in the section "Test methods".

A fourth aspect of the present invention is a paste, particularly for printing with a screen printing method, wherein the paste contains a composition according to the first aspect of the present invention or to one of its embodiments. In the context of the present invention, a paste is a mixture consisting of at least one solid and at least one liquid, said mixture being suitable for being used with a screen printing method.

Preferably, the paste has a viscosity within a range from 500 to 3000 mPa·s. The viscosity was determined according to the information given in the section "Test methods".

Further preferably, the paste contains solids within a range from 20 to 50 wt. %, wherein each of the percentages by weight is based on the total quantity of the paste.

A fifth aspect of the present invention is a method for producing a pattern on a substrate, at least comprising the following steps:
  A) providing a substrate and a composition containing silver carboxylate and terpene;
  B) applying the composition to the substrate while preserving a precursor with the pattern;
  C) treating the precursor with the pattern according to a treatment step selected from the group consisting of:
    a. at a temperature of more than 200° C. for at least 10 minutes, wherein the treatment is, preferably, carried out in an atmosphere of air;
    b. a photonic sintering process; or
    c. a combination of a) and b),
wherein the substrate to which the pattern is applied is preserved. Preferably, the precursor with the pattern is treated in an atmosphere of air.

Preferably, a composition according to the invention and according to the first aspect of the invention or to one of its embodiments is selected as composition in step A). Where appropriate, step C) is followed by a step D), cooling to room temperature.

As a matter of principle, the composition can be applied to the substrate using any method that is known and seems suitable to the person skilled in the art. These methods include printing, particularly screen printing or ink jet printing, spray application, brushing, writing and transferring the composition from a template to a substrate, such as in case of transfer printing. An application by means of ink jet printing or an application by means of screen printing is particularly preferred.

According to a preferred embodiment of the fifth aspect of the invention, the terpene is selected from the group consisting of orange terpene, limonene and pinene, or a combination thereof. Preferred forms of this embodiment are those which have already been described as being preferred in the context of component b) of the first aspect of the invention.

According to a preferred embodiment of the fifth aspect of the invention, the substrate is selected from the group consisting of glass, porcelain, earthenware, stoneware, fine stoneware, enamel, plastic, artificial resin, silicon, silicon dioxide, aluminium oxide, gallium arsenide, germanium, silicon germanium alloy, indium phosphide, a metal, or a combination of two or more thereof. Preferred plastics are selected from the group consisting of polyethylene terephthalate (PET), polyimide (PI), polyethylene naphthalate (PEN), polycarbonate (PC), or a combination of two or more thereof. If metal or plastic is selected as a substrate, it should have a melting point above the temperatures which are reached within the scope of applying the composition according to the invention. This is particularly applicable for the temperature in step C) of the fifth aspect of the invention.

According to a preferred embodiment of the fifth aspect of the invention, the pattern is selected from an element of the group consisting of
(A) a glossy decor; and
(B) an electrically conducting structure.

A glossy decor is understood to mean a shiny decor. A decor is an embellishment of an item and is usually not functional. The gloss of a decor or of a coating is determined according to the information given in the section "Test methods". The decor of this sample is a glossy decor if the gloss of the coating is 700 GU (GU=gloss unit) or more. It is, however, possible to reach considerably higher values of up to 2000 GU for polished metal surfaces and mirrors. The "calibration holder" supplied by the manufacturer of the device is used for calibration purposes.

According to a further preferred embodiment of the fifth aspect of the invention, the composition is applied by means of a printer. As a matter of principle, any printer and printing method that are known and seem suitable to the person skilled in the art can be used. Most preferably, the composition according to the invention is applied by means of ink jet printing or by means of screen printing.

An electrically conducting structure is understood to mean any electrically conducting structure that is known or seems suitable in the present case to the person skilled in the art, more particularly conductive tracks, circuit diagrams or the like. A structure, for example, a conductive track, is electrically conducting if the volumetric conductivity σ is $1 \cdot 10^6$ S/m or more at 25° C. This is determined using a resistance meter, LCR Meter by Rhode & Schwarz HM 8118.

According to a further preferred embodiment of the fifth aspect of the invention, the pattern has at least one of the following properties:
i) a gloss of at least 1300 GU at 20° C., wherein, often, a value of 1600 GU is not exceeded;
ii) an electrical conductivity of at least 30%, based on the conductivity of silver, wherein, often, an electrical conductivity of 50% is not exceeded.

A sixth aspect of the present invention is a printer at least including a printer head and a reservoir, wherein the reservoir contains a composition according to the first aspect of the present invention or to one of its embodiments, or an ink according to the third aspect of the present invention or to one of its embodiments, or a paste according to the fourth aspect of the present invention or to one of its embodiments.

Any printer that is known and seems suitable to the person skilled in the art can be used as a printer. In particular, ink jet printers and printers based on screen printing are preferred as printers.

According to a preferred embodiment of the sixth aspect of the invention, the printer is suitable and provided for carrying out a method according to the second aspect of the invention or to one of its embodiments.

A seventh aspect of the present invention is an item that contains, at least in part, at least a silver-containing coating, wherein the coating has a total percentage by weight of elements that are selected from the group consisting of gold, rhodium, vanadium, palladium, platinum, osmium and tungsten of less than 10 wt. %, or less than 5 wt. %, or less than 1 wt. %, or less than 0.1 wt. %, or less than 0.05 wt. %, wherein each of the percentages by weight is based on the total weight of the coating. Preferably, the coating does not have any of the elements mentioned.

According to a preferred embodiment of the seventh aspect of the invention, the coating is characterised by at least one of the following features:
a) a gloss of more than 1300 GU;
b) an electrical conductivity of at least 30%, based on the conductivity of silver; or
c) a combination of the two features.

An eighth aspect of the present invention is a use of a composition containing a silver carboxylate, preferably silver neo decanoate, and at least one terpene for applying a pattern. The composition is particularly preferably used as ink in ink jet printing or as paste in screen printing. The composition is particularly preferably used for producing a decor and for producing an electrically conducting structure, such as electrically conductive tracks, electric circuits, and the like.

With particular preference, the pattern, or the decor, or the electrically conducting structure has a gloss of more than 1300 GU. As regards further preferred gloss values, reference is made to the gloss values of the coating in the seventh aspect of the invention.

With particular preference, the pattern, or the decor, or the electrically conducting structure has an electrical conductivity of more than 30%, based on silver. As regards further preferred electrical conductivities, reference is made to the values of electrical conductivity of the coating in the seventh aspect of the invention.

FIGURES

In the following, the invention will be illustrated by way of examples based on figures. The invention is not limited to the embodiments and details shown in the figures.

FIG. 1 shows a flow diagram for a method for producing a pattern.

DESCRIPTION OF THE FIGURES

FIG. 1 shows a flow diagram for a method for producing a pattern. In step A), a substrate and a composition, which is a glossy ink in the illustrated instance, are provided. In step B), the composition is applied to the substrate in a previously selected pattern. In the subsequent step C), the substrate thus treated is treated at an increased temperature for a certain time, in the illustrated instance at 230° C. for 10 minutes. Therein, the pattern is applied to the substrate durably and permanently.

Test Methods a. Gloss Measurement

The gloss was measured as per the DIN EN ISO 2813: 2015-02 standard, using the gloss measuring instrument PolyGloss GL0030, available from TQC B.V. Netherlands, at an angle of 20° and a temperature of 23° C. Calibration was carried out as specified in the user guide (designated as V1.01 092013). The measuring geometries defined in the standard were complied with. Glass and polyimide film were used as substrates. The samples were planar and did not have any anisotropism. The dry coat thickness was <5 μm in the case of liquid samples and <5 μm in the case of pasty samples.

b. Electrical Conductivity

The electrical conductivity was measured using a resistance meter, LCR Meter, by Rhode & Schwarz HM 8118 (four-point measurement), Germany.

c. Viscosity

The viscosity of pasty samples was determined as per the DIN 53019 standard, using a Brookfield rheometer type DV3, spindle no. 14, at 10 RPM and at 25° C.

The viscosity of liquid samples was determined as per the DIN 53019 standard, using a Brookfield rheometer type DV3, spindle no. 21, at 100 RPM and at 20° C.

d. Determination of Metal Contents (ICP Analysis)

The inductively coupled plasma (ICP) is coupled to optical emission spectrometry (OES) for evaluation purposes. Typical determination limits according to the method used here are at 1 ppm (each based on the weighed-in sample quantity). The determination of the element concentration using the measuring instrument is carried out as specified by the manufacturer of the device (ICP-OES: VARIAN Vista MPX) and using certified reference liquids for calibration purposes. The element concentrations in the solution (100 ml) determined by the devices are then converted to the original weighted sample (0.1 g).

Note: The sample to be analysed is decomposed with aqua regia (a mixture consisting of 3 parts of HCl, 37 wt. %, and 1 part of $HNO_3$, 65 wt. %) in a microwave reaction system, MultiwavePro, by Anton Paar.

The following elements can be determined in this way: Ag, Au, B, Bi, Ce, Co, Cr, Cu, Fe, In, Ir, Mn, Ni, Pd, Pt, Rh, Ru, Sb, Si, Sn, Ti, V, Zn, Zr.

Examples

In the following, the invention is further illustrated by way of various examples. The invention is not limited to these examples.

Example Compositions

The following compositions were produced (each specified in wt. % of the component):

| Component | Example | | | | | |
| --- | --- | --- | --- | --- | --- | --- |
|  | I | II | III | IV | V | VI |
| Pine oil | — | 24.80 | — | 11.25 | — | — |
| Orange terpenes | 12.00 | — | 19.80 | 10.00 | 50.00 | — |
| Glycol ether | — | — | — | — | — | 70.00 |
| Silver neo decanoate 38% | 57.90 | 40.00 | 40.00 | 60.00 | 47.00 | 27.00 |
| Colophony - PO 2:1 | 21.00 | 28.00 | — | — | — | — |
| Bakelite LA751 | — | — | 33.00 | — | — | — |
| Colophony | — | — | — | 9.00 | — | — |
| Rhodium(III) solution, 5% | 2.60 | 2.00 | 2.00 | 3.5 | — | — |
| Carboxylic acid | 0.50 | 0.50 | — | 1.00 | 3.00 | 3.00 |
| HF8028 DS | 0.20 | 0.20 | 0.20 | 0.25 | — | — |
| HAN 8572 | 5.80 | 4.50 | 5.00 | 5.00 | — | — |
| Substrate | Float glass | Float glass | Float glass | Float glass | Polyimide film | Polyimide film |
| Conditioning of the substrate prior to being used | Preliminary cleaning with purified water, subsequent cleaning with a lint-free cloth soaked with ethanol | Preliminary cleaning with purified water, subsequent cleaning with a lint-free cloth soaked with ethanol | Preliminary cleaning with purified water, subsequent cleaning with a lint-free cloth soaked with ethanol | Preliminary cleaning with purified water, subsequent cleaning with a lint-free cloth soaked with ethanol | Cleaning with purified water, lint-free cloth | Cleaning with purified water, lint-free cloth |
| Gloss (GU) | ++ | + | + | +++ | +++ | + |
| Conductivity (L) | + | + | + | + | +++ | + |
| Storage stability | + | + | ○ | + | + | − |

Gloss: + = 1000-1300 GU; ++ = >1300 to 1500 GU; +++ = >1500 GU.

Conductivity: + = <20%, ++ = 20-<40%; +++ = ≥40%, each based on the conductivity of silver at 20° C.

Storage stability: + = excellent (>12 weeks); ○ = adequate (4-12 weeks); − = insufficient (<4 weeks).

Compositions nos. I-II as well as nos. IV-VI are according to the invention.

Composition no. III is a comparative example.

Ag Versatic 38% is a silver neo decanoate with 38 wt. % silver content, based on the total quantity of the composition. Purified water is demineralised water. This water has a conductivity within a range from 0 to 50 μS.

Orange terpene (CAS: 68647-72-3) has about 95% D-limonene and is available from Frey & Lau GmbH in Henstedt-Ulzburg, Germany.

Versatic® carboxylic acids are tertiary carboxylic acids and are available from HEXION Rotterdam, Netherlands, and others.

Colophony (CAS: 8050-09-7) is a mixture consisting of various rosin acids and is available from H. Reynaud & Fils (Germany) GmbH, Hamburg.

Rh(III) solution is a rhodium nonanoate which is produced by Heraeus Deutschland GmbH, Hanau. In the present case, a solution with 5 wt. % of rhodium is used, based on the total weight of the solution.

HF8028DS is a silicone-containing additive which is produced by Heraeus Deutschland GmbH, Hanau.

HAN8572 is an aromatic-aliphatic hydrocarbon mixture and available from EXXON MOBIL CHEMICAL, Antwerp.

Producing a Coated Item

Test pieces 10 cm×0.2 cm×0.8 cm in size (W×H×D) and made of glass were chosen as substrate. The test pieces were cleaned with purified water and ethanol. A coat of a silver-containing composition (see above, types I-IV) having a wet coat thickness of >20 μm was applied by screen printing. The coat was sintered on the substrate in an oven at a temperature of >350° C. for 10 minutes.

Test pieces 10 cm×0.1 cm×10 cm in size (W×H×D) and made of polyimide film were chosen as substrate. The test pieces were cleaned with purified water and a lint-free cloth. A coat of a silver-containing composition (see above, types V and VI) having a wet coat thickness of >5 μm was applied by ink jet printing. The coat was sintered on the substrate in an oven at a temperature of 230° C. for 10 minutes.

The invention claimed is:

1. A composition comprising:
   a) a saturated silver carboxylate;
   h) a cyclic terpene; and
   c) at least one carboxylic acid, wherein the composition has a viscosity of from 2 to 100 mPa·s, wherein the terpene is a hydrocarbon that can be isolated from natural products, the skeleton of which can be attributed to one or more isoprene units, and wherein the composition has a storage stability of at least 4 weeks.

2. The composition according to claim 1, wherein the terpene is selected from the group consisting of orange terpene, limonene and pinene, or a combination thereof.

3. The composition according to claim 1, further comprising at least one elemental metal selected from the group consisting of gold, rhodium, vanadium, palladium, platinum, osmium and tungsten.

4. The composition according to claim 1, wherein the sum of percentages by weight of a) and b) is within a range from 20 to 95 wt. %, based on the total weight of the composition and the composition further comprises at least one component selected from the group consisting of an organic solvent, an adhesion promoter, and a viscosity aid.

5. The composition according to claim 1, wherein the silver carboxylate is silver neodecanoate.

6. The composition according to claim 1, wherein the composition further comprises at least one component selected from the group consisting of an organic solvent, an adhesion promoter, and a viscosity aid.

7. The composition of claim 1 wherein the carboxylic acid is a tertiary carboxylic acid.

8. The composition of claim 1, containing no metal particles.

9. The composition of claim 1, having a content of metal particles of less than 1 wt %.

10. The composition of claim 1 wherein the composition contains two or more carboxylic acids.

11. The composition of claim 1, wherein the carboxylic acid is branched.

12. The composition of claim 1, wherein the carboxylic acid is a tertiary carboxylic acid.

13. The composition of claim 12, wherein the carboxylic, acid is a tertiary carboxylic acid having at least five carbon atoms.

14. An ink for ink jet printing, wherein the ink comprises a composition according to claim 1.

15. A paste for printing with a screen printing r Method, wherein the paste comprises a composition according to claim 1.

* * * * *